(12) United States Patent
Grosso

(10) Patent No.: US 6,802,499 B2
(45) Date of Patent: Oct. 12, 2004

(54) EQUIPMENT WHICH CAN BE USED BY AN INDUSTRIAL ROBOT FOR GRIPPING WORKPIECES OR ASSEMBLIES BEING PROCESSED OR ASSEMBLED AND HAS A SEPARABLE MODULAR STRUCTURE, WITH A DEFINITE AND REPEATABLE GEOMETRY

(75) Inventor: Clemente Grosso, Grugliasco (IT)

(73) Assignee: Comau S.p.A., Turin (IT)

( * ) Notice: Subject to any disclaimer, the term of this patent is extended or adjusted under 35 U.S.C. 154(b) by 0 days.

(21) Appl. No.: 10/440,268

(22) Filed: May 19, 2003

(65) Prior Publication Data

US 2003/0214087 A1 Nov. 20, 2003

(30) Foreign Application Priority Data

May 17, 2002 (IT) .................................... TO2002A0422

(51) Int. Cl.⁷ ................................................ B23Q 1/04
(52) U.S. Cl. ............................ 269/71; 269/45; 269/152; 269/69

(58) Field of Search ............................ 269/45, 152, 69, 269/71, 43, 296, 61, 56, 57, 58, 60, 88, 114, 113, 73; 414/680, 225; 144/286 A; 82/129; 29/38 A, 38 B; 409/165, 168, 219, 221, 224

(56) References Cited

U.S. PATENT DOCUMENTS

| | | | | |
|---|---|---|---|---|
| 4,653,739 A | * | 3/1987 | Moore | 269/61 |
| 4,666,363 A | * | 5/1987 | Johansson | 414/736 |
| 5,639,204 A | * | 6/1997 | Nihei et al. | 414/680 |
| 6,347,733 B1 | * | 2/2002 | Hickey, II | 228/49.1 |
| 6,643,905 B2 | * | 11/2003 | Rhoads et al. | 29/407.09 |

* cited by examiner

Primary Examiner—Robert C. Watson
(74) Attorney, Agent, or Firm—Sughrue Mion, PLLC

(57) ABSTRACT

Described herein is equipment which can be used by an industrial robot for gripping workpieces or assemblies being processed or assembled and has a separable modular structure, with a definite and easily repeatable geometry.

8 Claims, 5 Drawing Sheets

EQUIPMENT WHICH CAN BE USED BY AN INDUSTRIAL ROBOT FOR GRIPPING WORKPIECES OR ASSEMBLIES BEING PROCESSED OR ASSEMBLED AND HAS A SEPARABLE MODULAR STRUCTURE, WITH A DEFINITE AND REPEATABLE GEOMETRY

BACKGROUND OF THE INVENTION

The present invention relates to the field of equipment which can be used by industrial robots for gripping workpieces or assemblies being processed or assembled.

Equipment of this type is used, for example, in the automobile industry for supporting assemblies or subassemblies of bodies of motor vehicles during welding operations and/or assembly operations of various kinds, which are typically performed with automatic welding devices and/or assembly devices.

In the above applications, there exists, of course, the need to guarantee that the industrial robot will support the workpiece or assembly, on which it is necessary to operate in a rigorously pre-determined precise position. Gripping equipment used by robots for the aforesaid purposes present, of course, a part designed for being connected directly to the robot and a plurality of reference and positioning elements designed to engage with the workpiece or the assembly that is to be supported, which guarantee that the latter will find itself in a pre-determined position with respect to said reference and positioning elements. Obviously, it is equally essential that the structure of the gripping equipment should present a rigorously defined rigid geometry, which will guarantee that the various reference and positioning elements will find themselves in rigorously pre-determined spatial positions with respect to the part of the equipment that is directly connected to the robot.

In the past, for the purpose of guaranteeing a rigid and precise geometry of the equipment there has usually been adopted gripping equipment having a structure made of metal elements welded together. If, on the one hand, said solution might guarantee a structure with a rigorously defined geometry, on the other hand it entails considerable problems when it is necessary to reproduce the same starting geometry, for example, after possible damage of the structure following upon a collision with an external body during use of the equipment by the robot. Obviously, in such an eventuality it is neither possible to guarantee that the deformed welded structure will be brought back again to the initial geometry nor to certify that the structure will go back to the initial geometry in a simple and rapid way.

When an attempt is made to solve the aforesaid problem by adopting for the gripping equipment a structure consisting of elements connected to each other in a separable way, the new problem arises of guaranteeing that the assembled structure will have a rigorously precise and pre-determined geometry and above all that said geometry will be reproducible, for example after a deformation or failure of one or more of its components following upon an accidental collision, in a way that is simple, rapid and easily certifiable.

SUMMARY OF THE INVENTION

The purpose of the present invention is to provide an effective and efficient solution to the aforesaid problem.

In order to achieve said purpose, the subject of the invention is a piece of equipment which can be used by an industrial robot for gripping workpieces or assemblies being processed or assembled.

Thanks to the aforesaid characteristics, the reticular structure with circular bars which supports each reference or positioning element may be assembled in an easy and rapid way, guaranteeing rigorous respect of the desired geometry.

Thanks to the characteristics indicated above, the equipment according to the invention is able to provide an efficient solution to all the problems set forth above. The fact that it is made up of modules connected together in an uncoupleable way obviously enables easy restoration of the modules which are deformed or anyway damaged, for example following upon accidental collisions, without there existing the need for replacing the entire structure. The use of components consisting of modules in the form of metal sectional elements simplifies and rationalizes assembly of the structure of the equipment. Finally, the pre-arrangement at pre-determined intervals of length of the aforesaid pairs of notches in the slits of the sectional elements, for the engagement of the guide bushings of the connection screws, provides a simple and at the same time extremely efficient means for guaranteeing convenient repeatability of the geometry of the structure. In practice, in fact, the various pairs of opposed notches define along the external surface of the sectional element a series of seats set at equal distances apart from one another, which can be used for positioning the connection screws. The said seats therefore provide in the sectional element a sort of indexing that enables for the user immediate identification of the point of connection, which is thus uniquely defined by counting the number of seats along the sectional element starting from one end of the sectional element up to the seat in which it is desired to engage the connection screw. The above basic principle can be used in all the connections between the sectional elements which make up the structure of the gripping equipment, as well as in the connection of the sectional elements with a component, typically a plate, designed to be connected to the industrial robot.

BRIEF DESCRIPTION OF THE DRAWING

Further characteristics and advantages of the invention will emerge clearly from the ensuing description with reference to the annexed drawings, which are provided purely by way of non-limiting example and in which.

DETAILED DESCRIPTION OF THE INVENTION

Figure 1:
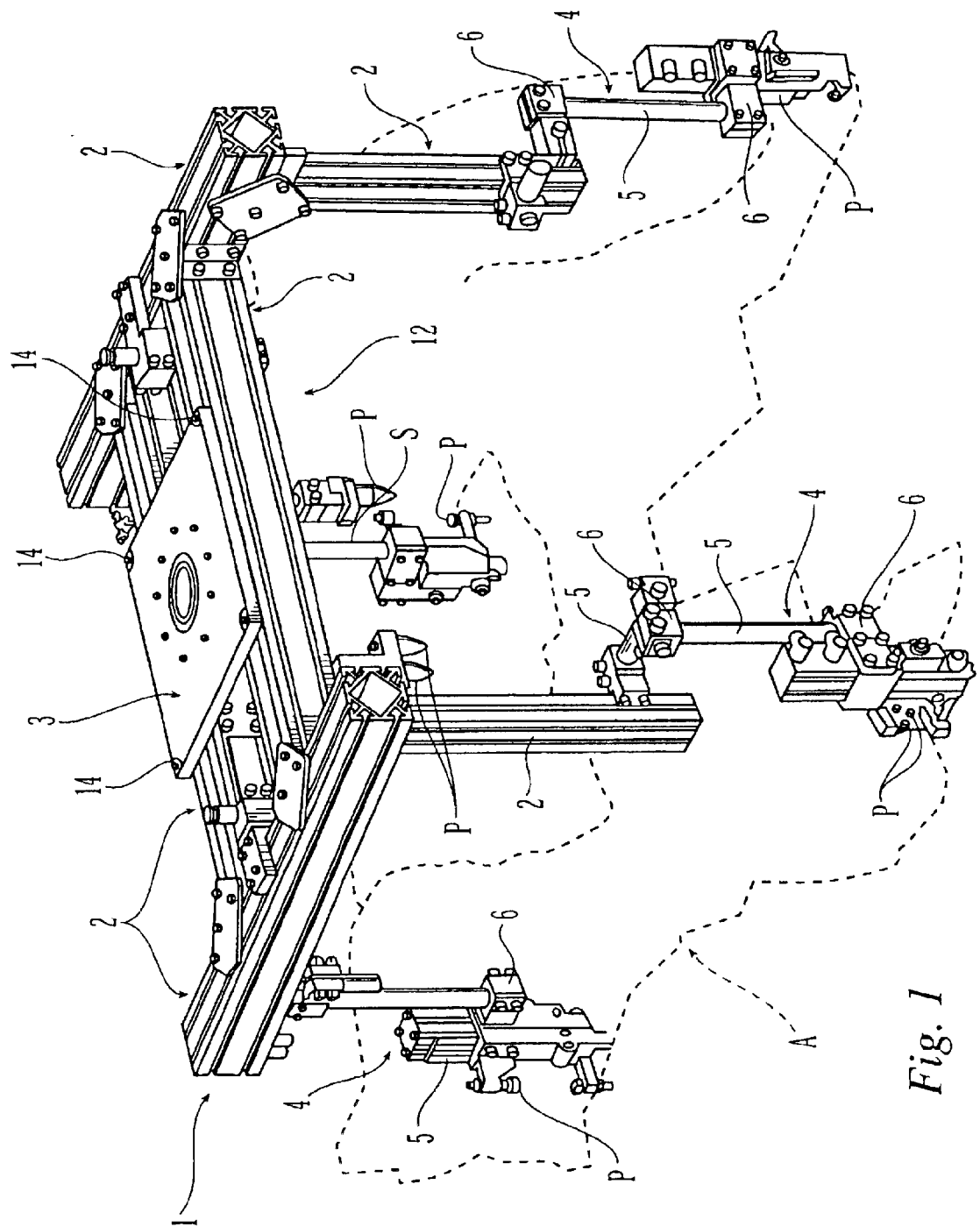
FIG. 1 is a perspective view of an example of embodiment of equipment for gripping an assembly of a body of a motor vehicle, which can be used by an industrial robot.
Figure 3:
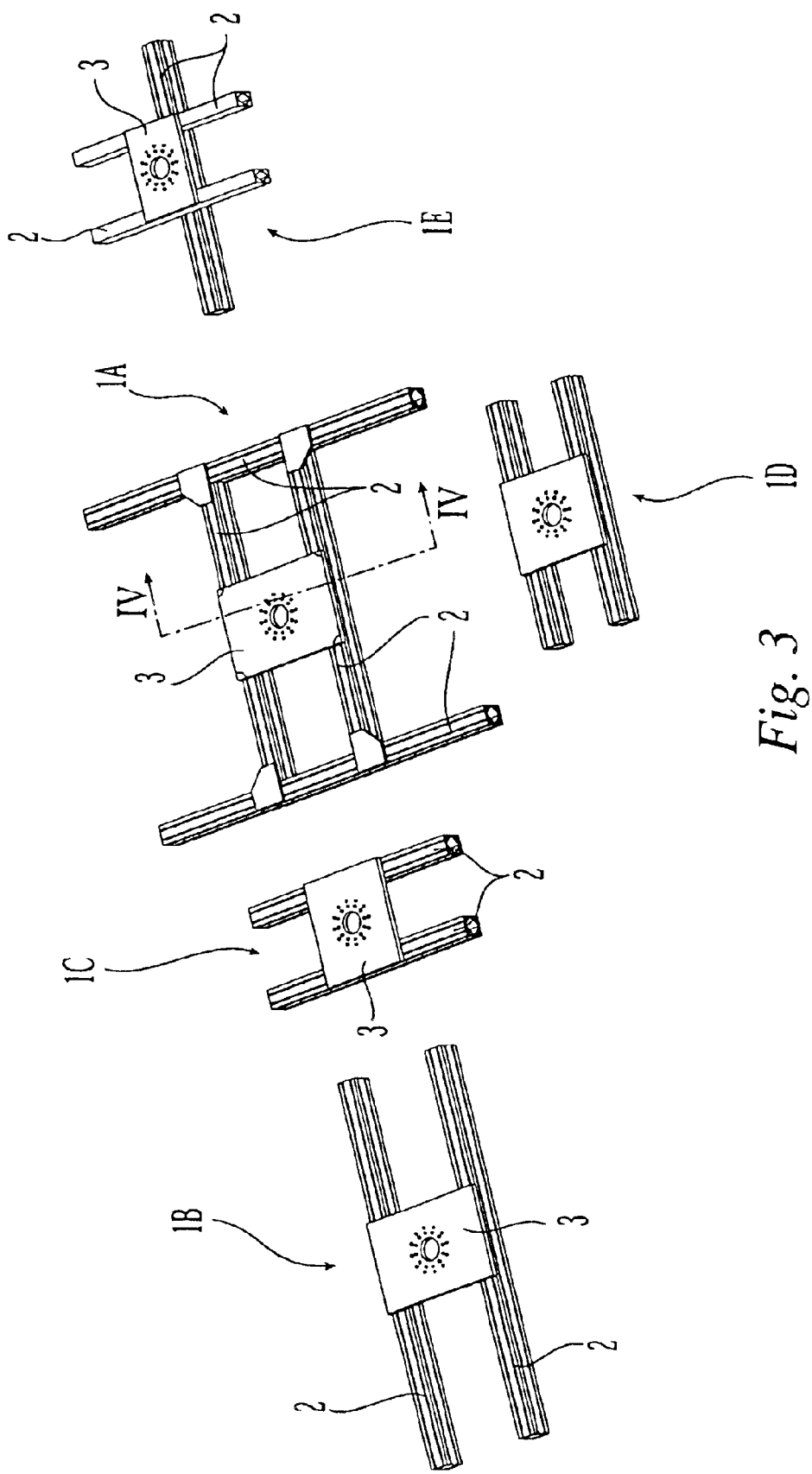
FIG. 3 is a perspective view of different possible embodiments of the top part of the equipment, said part being designed to be coupled with the industrial robot.

In FIG. 1, the reference number 1 designates, as a whole, a piece of equipment which can be used by an industrial robot for gripping an assembly of a body of a motor vehicle, which is schematically illustrated in FIG. 1 and is designated by A. The equipment 1 includes a modular reticular structure 12, defined by a plurality of modules 2, which are connected together by means of screw connections and are each made up of extruded sectional element made of metal, for example, aluminum. The reference number 3 designates a plate for connection of the equipment to an industrial robot. In the example of embodiment illustrated in FIG. 1, the plate is connected on top of the two modules 2, which are parallel to one another and are, in turn, connected at their ends to two further modules 2 set parallel to one another and orthogonal to the modules of the first pair. The above configuration is also shown in FIG. 3, where it is designated by 1A. FIG. 3 illustrates possible variants of said configuration, which are designated by 1B, 1C, 1D and 1E, respectively.

As is also shown in FIG. 1, coming down vertically from the top portion of the structure 1 are further modules 2.

The structure described above supports a plurality of positioning and/or reference elements for the assembly A, which are designated by P. The various positioning elements P are connected to the modular reticular structure 12 made up by the modules 2, by means of auxiliary modular reticular structures 4 comprising bars 5 with circular cross section and interconnection blocks 6.

Figures 2, 2A:
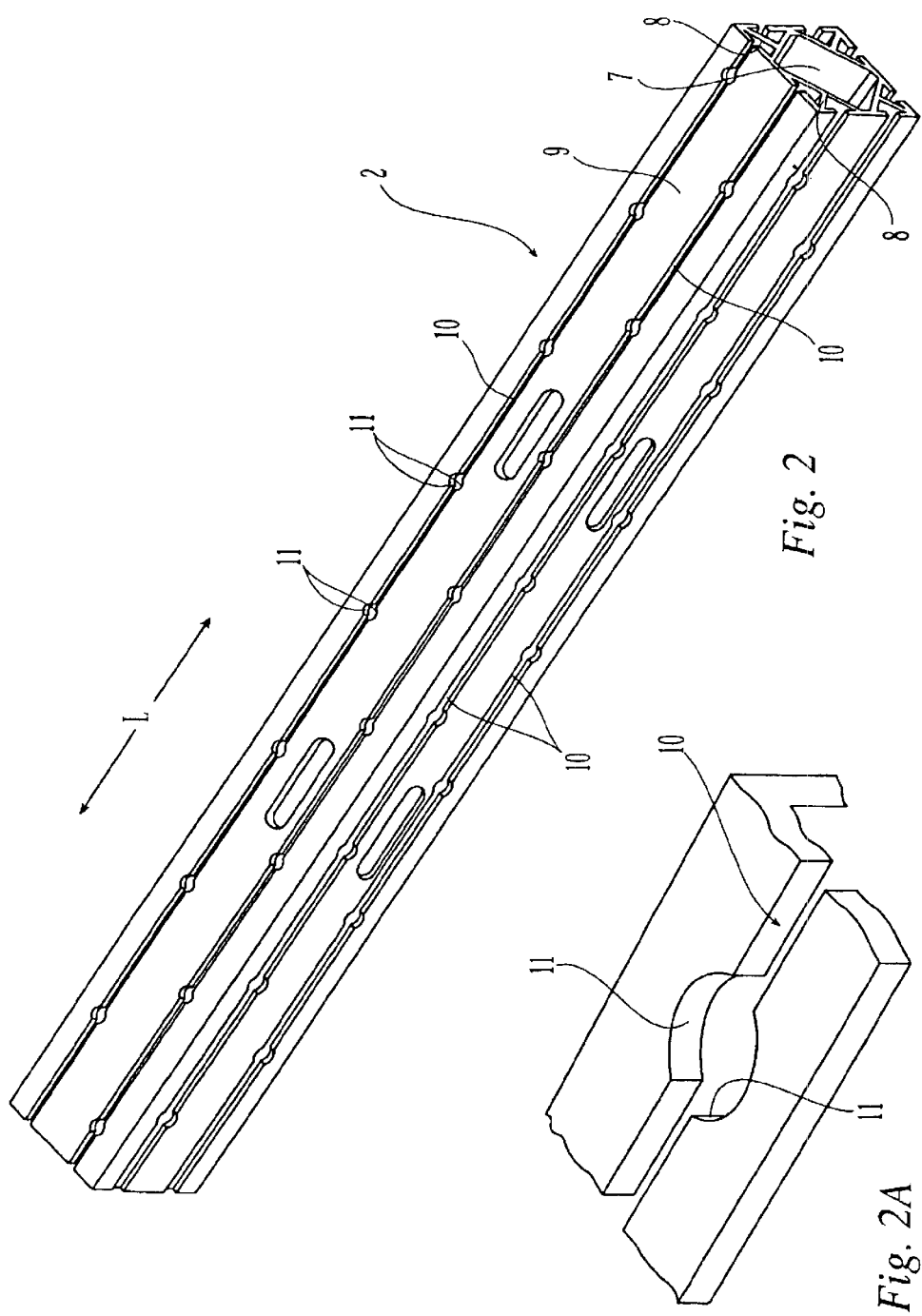
FIG. 2 is a perspective view of an extruded sectional element of aluminium which constitutes a module of the structure of the equipment of FIG. 1.
FIG. 2A is a view at an enlarged scale of a detail of FIG. 2.

FIG. 2 illustrates an example of module 2 made of an extruded sectional element of aluminum. In the example illustrated, the module 2 comprises a central channel 7, which is uniquely provided for the purpose of lightening the structure and has a substantially rhomboidal cross section, where each side of the rhombus faces towards a respective edge of the module 2, which has a substantially square cross section. Made in the wall of each side of the module 2 are two longitudinal cavities 8 which are open to the respective external surface 9 of the sectional element by means of a restricted inlet defined by a longitudinal slit 10.

Provided along each longitudinal slit 10, at rigorously constant intervals of length L, are pairs of circular notches 11 (see the enlarged detail of FIG. 2A) defining respective seats for guide bushings (two of said bushings can be seen in FIG. 4 and are designated by 13) for engagement of the connection screws (which can be seen in FIG. 4 and are designated by 14) of the various modules of the structure.

Figure 4:
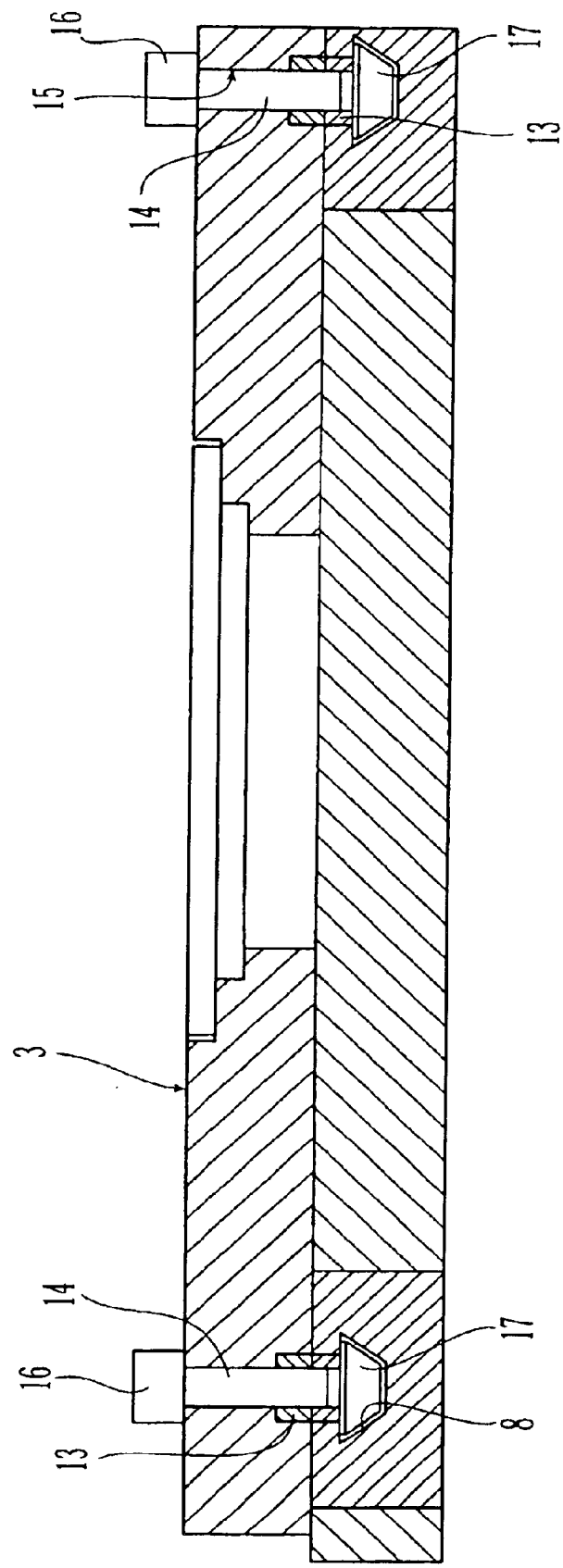
FIG. 4 is a cross-section taken along the line IV—IV of FIG. 3.

FIG. 4 illustrates an example of connection with reference to the join between the plate 3 and the two modules 2 connected thereto. As may be seen, the plate 3 has holes 15 for engaging the connection screws 14. Each screw 14 has a head 16 which rests on top of the plate 3 and traverses a guide bushing 13 received in a seat defined by a pair of notches 11 in the module 2. The longitudinal cavity 8 set immediately underneath receives a nut 17 for fixing the screw 16. The same connection, which is shown in FIG. 4, can be naturally reproduced for joining the modules 2 to each other. Consequently, as may be seen, the entire modular reticular structure 12 of the equipment is obtained by means of detachable connections. At the same time, the distribution at regular intervals of the seats consisting of the pairs of facing notches 11 for the guide bushings 13 enables an immediate reference to be obtained for positioning the various connection screws. Each module 2 comes to form a component similar to the ones used in the game of "Meccano" (registered trademark), where the point of connection is immediately identified by counting the connection holes starting from one end of the component. In the case of the present invention, each module of the gripping equipment has an aligned distribution of seats set at equal distances apart which make it possible to reproduce any desired geometry whatsoever with extreme ease and rapidity.

Of course, the conformation of the cross section of the extruded sectional elements constituting the modules 2 of the structure can be any whatsoever and even altogether different from the one illustrated herein purely by way of example.

Figure 5:
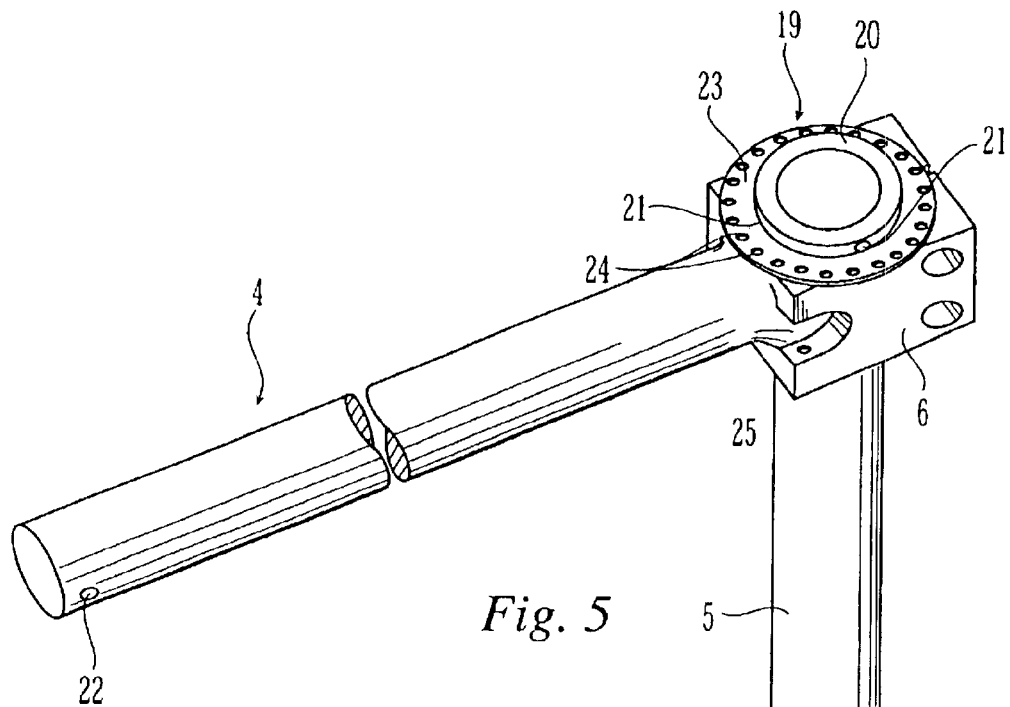
FIG. 5 is a perspective view at an enlarged scale of a reticular structure for supporting a positioning element.
Figure 6:
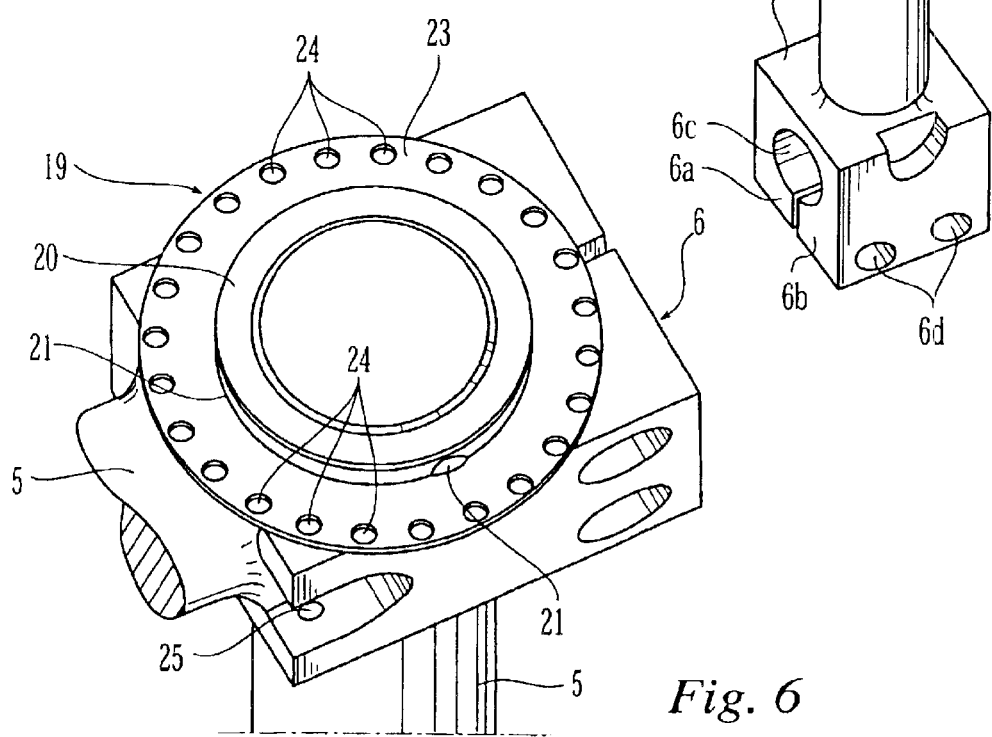
FIG. 6 is a view at an enlarged scale of a detail of FIG. 5.

FIG. 5 shows a detail of an example of an auxiliary modular reticular structure 4 for supporting a reference pin designed to engage a corresponding seat in the assembly being processed in order to guarantee precise positioning thereof. As may be seen also from FIG. 1, the structure 4 is made up of bars 5 having a circular cross section, each one of which has one end rigidly connected to a block 6 with a cut that defines two gripping jaws 6a, 6b for gripping another bar in the passage 6c between the jaws, by means of securing bolts which engage holes 6d. The end of each bar 5 opposite to the block 6 is tightened in the block 6 of another bar.

There are moreover provided reference devices that guarantee precise positioning of each bar 5 in relation to a respective block 6. In the example illustrated in FIG. 5, each of the said devices 19 has a hub 20, which is fitted on a respective bar 5 and which has at least one radial hole 21 (in the example illustrated two radial holes are provided set at 90° from one another) for engaging connection pins designed to engage respective radial holes 22 (in FIG. 5 a radial hole 22 can be seen at the other end of the bar 5) made on each end of the bar 5. The annular element 19 further includes a crown 23 with a circumferential series of holes 24 having an axis parallel to the axis of the hub 20 and designed to be engaged selectively by axial connection pins, designed to engage holes 25 located in the block 6 along an axis parallel to the axis of the bar 5 on which the device 19 is fixed.

As may be seen, thanks to the use of reference devices 19, it is possible to guarantee in an easy and rapid way the desired geometry for the reticular structure 4.

In conclusion, the equipment according to the invention enables on the one hand a reproducibility thereof with simple, easy and rapid operations, and on the other hand guarantees the possibility of certifying the geometry of the structure itself in a way that is equally simple and rapid.

Of course, without prejudice to the principle of the invention, the details of construction and the embodiments may vary widely with respect to what is described and illustrated herein purely by way of example, without thereby departing from the scope of the present invention. For example, although the annexed claims refer explicitly to equipment designed for being used by an industrial robot, there is to be considered included in the scope of the present invention any structure for supporting or gripping pieces or assemblies undergoing processing or assembly that has the characteristics referred to in the annexed claims, even were the said structure not to be designed for being used by a robot.

What is claimed is:

1. Equipment which can be used by an industrial robot for gripping pieces or assemblies being processed or assembled, comprising a modular reticular structure (12), defined by a plurality of modules (2), which are connected together by means of screw connections (14), and a plurality of positioning elements (P) joined to the aforesaid modular reticular structure by means of respective auxiliary modular reticular structures (4), in which each of said auxiliary structures (4) comprises one or more bars (5) with circular cross section and one or more interconnection blocks (6), as well as one or more reference devices (19) for reference of the correct reciprocal position of each bar in relation to a respective block.

2. The equipment according to claim 1, characterized in that each bar (5) has one end which carries a block (6) defining a passage (6c) for tightening within it another bar (5) and the opposite end which can be tightened within the block (6) carried by another bar (5).

3. The equipment according to claim 1, characterized in that said reference device (19) comprises a hub (20), which is designed to be fitted on a bar (5) and is provided with at least one radial hole (21) for engaging a connection pin designed to be received in a radial hole (22) located in the bar (5), said reference device (19) further comprising a crown (23) with a circumferential series of holes (24) having axes which are parallel to of the hub (20) and can be engaged selectively by one or more connection pins designed to be received in holes (25) made in a respective one of said blocks (6), in which the aforesaid bar is tightened, according to an axis parallel to an axis of the bar (5).

4. The equipment according to claim 1, characterized in that each of the modules of the main reticular structure is made up of a metal sectional element, having at least one longitudinal cavity (8) which opens to an external surface (9) of the sectional element by means of a longitudinal slit (10) of smaller width than that of the cavity (8), in which along each of said slits (10), at intervals of fixed predetermined length (L), there are obtained pairs of opposed notches (11) in the facing edges of the slit (10), for engaging guide bushings (13) for connection screws (14) for connecting the modules (2) of the structure.

5. The equipment according to claim 4, characterized in that said pairs of opposed notches (11) have a profile of the arc of a circle and define a seat with a circular shape for the respective guide bushing (13).

6. The equipment according to claim 4, characterized in that each profile (2) has a pair of longitudinal cavities (8) parallel to one another, which define respective slits (10) parallel to one another, with two aligned series of seats defined by opposed notches (11), which are also parallel to one another, on each side of the module (2).

7. The equipment according to claim 6, characterized in that each module (2) has a quadrilateral cross section.

8. The equipment according to claim 4, characterized in that it further includes a plate (3) for connection to a robot, which is provided with holes (14) for engagement of screws to respective modules (2).

* * * * *